R. SIEGMUND.
CENTRIFUGAL GOVERNOR.
APPLICATION FILED FEB. 7, 1906.
899,570.
Patented Sept. 29, 1908.
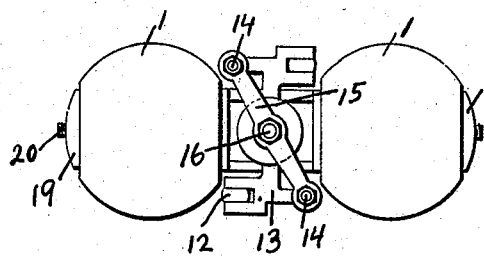
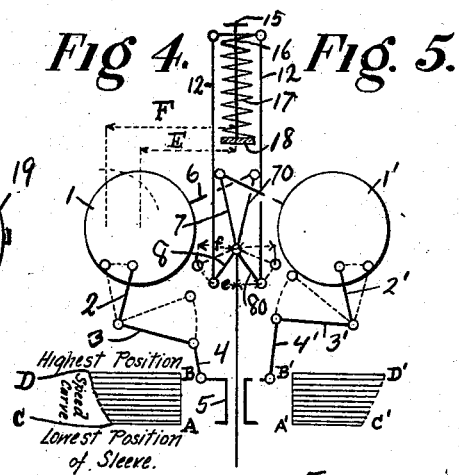
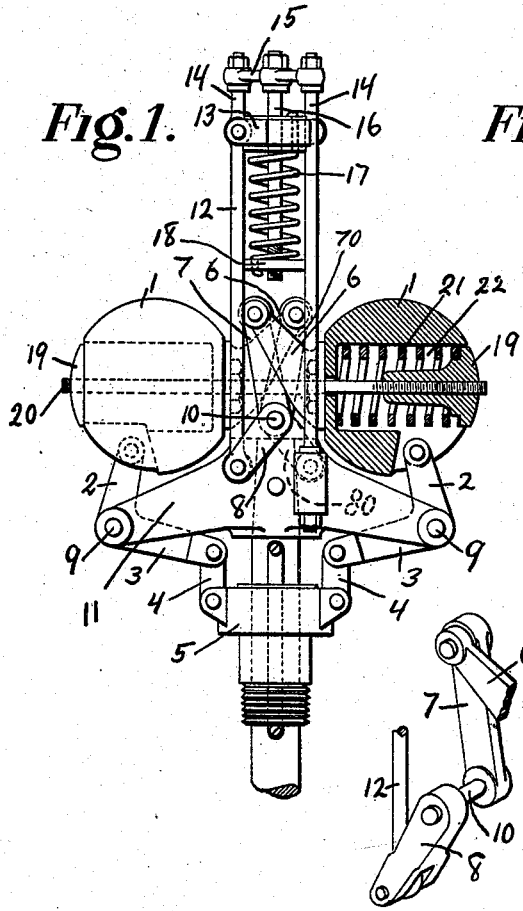
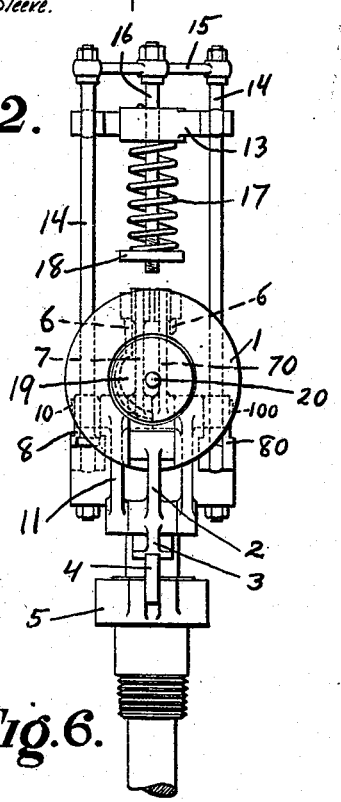
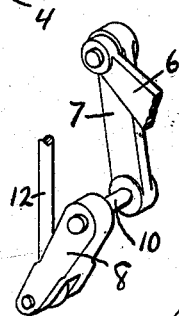
WITNESSES:
John C. Penner
Frank E. Dennett
R. Siegmund INVENTOR
BY
ATTORNEY.

UNITED STATES PATENT OFFICE.

RUDOLPH SIEGMUND, OF MILWAUKEE, WISCONSIN, ASSIGNOR TO ALLIS-CHALMERS COMPANY, OF MILWAUKEE, WISCONSIN, A CORPORATION OF NEW JERSEY.

CENTRIFUGAL GOVERNOR.

No. 899,570.   Specification of Letters Patent.   Patented Sept. 29, 1908.

Application filed February 7, 1906. Serial No. 299,882.

*To all whom it may concern:*

Be it known that I, RUDOLPH SIEGMUND, a subject of the Emperor of Austria-Hungary, but having declared my intention to become a citizen of the United States, residing at Milwaukee, in the county of Milwaukee and State of Wisconsin, have invented certain new and useful Improvements in Centrifugal Governors, of which the following is a specification.

This invention relates to a centrifugally operable device.

This invention has utility when embodied in a spring governor of the fly ball type, either for direct acting or relay regulation, as the construction permits of great sensitiveness, uniform action for different positions, adjustment of permissible fluctuation, loading to change speed, and the speed change may approach a constant with variable governor power, or the governor power may be constant with greater variation in movement of control device as affected by the speed.

Referring to the drawings: Figure 1 shows an elevation, partly in section, of an embodiment of the invention in a governor. Fig. 2 is an end view, and Fig. 3 a plan view thereof. Fig. 4 is a diagrammatic scheme to better illustrate the operation of the invention built in accordance with showing in Fig. 1. Fig. 5 is a diagrammatic showing, bringing out difference in operation due to change in the angle of one of the bell cranks. Fig. 6 is a perspective view of a detail.

The fly balls or weights 1 are carried on bell cranks having arms 2 connected to the weight, and arms 3 connected by links 4 to the driven means 5, which, in the instance shown, is a control device. Each fly weight has an extension or arm 6, one of which is connected to a bell crank having arm 7 attached to the arm 6; the other arm 8 of the bell crank being at an angle thereto, which angle need not be a right angle. The other arm 6 is connected to a bell crank having arms 70 and 80. The bell cranks 2, 3 are mounted on the pins 9, and the bell cranks 7, 8 and 70, 80 are mounted on the pins 10 and 100. These pins are carried in the fixed frame 11. The bell crank 7, 8, is composed of the two arms 7 and 8 which are attached at opposite ends of pin 10, the pin being supported between said arms by the frame 11. The bell cranks 7, 8, 70 and 80, and 2, 3, support the fly weights, and the supports thus provided being located above and below the centers of gravity of the balls, provide convenient means for supporting the balls irrespective of the exact position of the centers of gravity of the balls, whereby the balls are properly supported to perform their function without necessitating a delicate balancing of the balls with respect to supports. Attached to the bell crank arm 8 is the link 12 having its opposite end connected to the sliding cross-head or driven means 13, guided by rods 14, which rods 14 are mounted upon the frame 11 and have their upper ends steadied by the bar 15. The bar 15 carries the stem 16, around which stem is mounted the tension spring 17 between the cross-head 13 and adjusting nut 18, which nut has threaded engagement with the stem 16.

Adjusting nuts 19 are mounted on the rod 20 to restrain the compression springs 21 in the recesses 22 of the balls 1. The spring 17 serves as a loading device for the governor, or as a normal speed adjustment, for by varying the action of this spring 17, the speed at which the balls will be thrown out may be changed. The springs 21 serve as a means for varying the permissible speed fluctuation limit; that is, if the compression of the spring 21 were increased, the governor would become less sensitive to slight variations in speed; while if the compression of the spring were decreased, the stability of the governor would be decreased; that is, a less change in speed would be necessary to cause the governor to actuate the controlled device. Adjustment of the spring 17 serves to vary the normal speed of the governor independently of the governor's stability. Adjustment of the springs 21, while changing the stability of the governor, also slightly affects the normal speed. Accordingly, if a change of stability is desired and it is wished to also retain the normal speed, adjustment of the nuts 19 and 18 is necessary. The springs 21 oppose the centrifugal force of the fly weights, the centrifugal force generated by one fly weight and tending to cause the rod 20 to move being balanced by the centrifugal force generated by the other fly weight, this latter centrifugal force acting upon rod 20 in a direction opposite to that of the first, whereby tendency of rod 20 to move endwise is neutralized. The great advantage of this specific construction is that it provides a simple and convenient means for directly opposing the centrifugal forces developed without imposing loads upon pins which would be necessary were these centrifugal forces opposed by means of fulcrumed levers. With the construction illustrated by the drawings accompanying this specification, the pins which serve as fulcrums for the bell cranks are subjected to only sufficient strain to overcome the inertia or resistance which must be overcome as the governor performs its function; wherefore, the friction loads upon these pins are reduced to a minimum, thereby insuring sensitiveness of the governor.

Referring to Fig. 4, the operation of the device is as follows: The bell crank 2 3 is a right angle lever and, as shown, its range of movement from its limit in one direction, shown in full lines, to its limit of movement in the opposite direction, shown in dotted lines, results in the mean movement of its arm 2, being substantially parallel to the axis of the driving element or frame 11. As this bell crank is a right angled lever, its opposite arm has its mean movement normal to the axis of the rotary driving element 11, or parallel to the radius of the circle in which the fly balls revolve. This particular form of the bell crank lever 2 3 results in a nearly uniform lift of the sleeve 5 during the total arc of movement of the arm 3 resulting from change of speed. The particular mounting of the arm 2 relative to the fly weight 1 tends to restrain the ball movement more nearly to a plane normal to the axis of the rotary element. Referring to the curve development: A to B serves to show total movement of the sleeve 5. Laying off the speed of the governor for lowest position of the sleeve as A—C, then taking a point above and speed the governor until the sleeve is lifted to that point, a resulting speed is obtained which is laid off parallel to the line A—C from the position of the sleeve taken on the line A—B. By taking several positions of the sleeve and laying off the speeds parallel to the line A—C from those points, a speed curve is produced corresponding to the line C—D. This curve shows that with a governor having a right angled bell crank, the lift increases as the speed decreases. That is, should the controlled device have considerable inertia of rest, the right angled structure is not so desirable, for it exerts less lifting power for a greater speed change in its initial movements. Considering the bell cranks having the arms 70, 8: The fly weight 1 at its inner position revolves with radius E. At its outer position the fly weight revolves with radius F. At its inner position the fly weight, through its arm 6 and bell crank 70, 80, gives the arm 80 of the bell crank an effective radius $e$ for transmitting force through the rod 12 to affect the yieldable means 17.

As the radius of rotation of the weight 1 increases to F, the increased power due to centrifugal force from the greater linear velocity of the weight is transmitted to the yieldable means 17 through a greater effective radius $f$ of the arm 80, and accordingly proportionally less power is transmitted to the spring 17. In mounting the bell crank lever 70, 80, it is so positioned that the effective radius of the arm 80 shall proportionally approximate the effective radius of the fly balls. That is, $E:F::e:f$ approximately.

Referring to Fig. 5: The fly weight 1' is mounted on the bell crank lever 2' 3', which lever has the angle between its arms of less than 90°. The arm 3' is connected to the link 4'. As shown, the mean of movement of the arm 2' is parallel to the axis of the rotary driving element. The arm 3' in all its movement lies on one side of a normal from its pivot point to the axis of the rotary driving element. By this structure, while the radial movements of the fly weight are approximately uniform as affecting movement of the arm 2', these movements as transmitted to the arm 3' produce a gradually decreasing effect upon the link 4'. Developing a curve for such a structure similar to the process described in Fig. 4, the lines A'—B' show movement of the sleeve and C'—D' the speed curve which very closely approximates a straight line. Accordingly this structure is one in which the speed changes produce an approximately constant change in the position of the sleeve. This structure would be desirable in a situation where there is no great inertia of rest to be overcome in the earlier movements of the sleeve.

The operation of the governor disclosed by Figs. 1, 2 and 3 of the drawings is as follows: As the spindle and fixed frame 11 are revolved, the weights 1 will be thrown out by centrifugal force, their outward movement being opposed by the springs 21 with a resistance depending upon the adjustment of the nuts 19. As the weights are supported by the arms 7 and 70, and the bell cranks 2, 3, they are free to respond to the centrifugal forces developed, the only resistance which they have to overcome being the inertia and weight of the collar 5 (including the mechanism to which it may be connected) and the tension of spring 17, and as the centrifugal forces developed are opposed by the springs 21, the only friction loads which the pins 9, 10 and 100 have to bear are the loads due to overcoming the work imposed upon the bell crank levers, which is much less than would be the friction loads imposed upon these pins if they had to act as fulcrums against which the bell crank levers acted to oppose the centrifugal forces of the fly weights.

What is claimed and it is desired to secure by Letters Patent, is:—

1. The combination in a governor, of a fly weight, a plurality of links engaged with said weight to support the same, and a spring to oppose outward movement of said fly weight under the influence of centrifugal force.

2. The combination in a governor, of a plurality of fly weights, a plurality of links engaged with each of said fly weights and supporting the same, springs adapted to oppose outward movement of said fly weights under the influence of centrifugal force, and means connecting said springs.

3. The combination in a governor, of a plurality of fly weights, a plurality of links engaged with each of said fly weights and supporting the same, springs adapted to oppose outward movement of said fly weights under the influence of centrifugal force, means connecting said springs, and an additional spring also adapted to oppose outward movement of the weights under the influence of centrifugal force.

4. The combination in a governor, of a plurality of fly weights, a plurality of links engaged to each of said fly weights and supporting the same, springs adapted to oppose outward movement of said fly weights under the influence of centrifugal force, means connecting said springs, an additional spring also adapted to oppose outward movement of the weights under the influence of centrifugal force, and driven means connected to the weights.

5. The combination in a governor, of a fly weight, bell crank levers supporting and positioning said weight, and a spring to oppose the outward movement of said weight under the influence of centrifugal force.

6. A governor, including a fly weight, a pair of levers supporting the weight, loading means engaged by one lever, and a controlled device engaged by the other lever.

7. A governor, including a fly weight, a pair of levers supporting the weight, loading means engaged by one lever, a controlled device engaged by the other lever, and a spring resisting outward movement of the weight.

8. A governor, including a rotary element, a fly weight driven by the element, and a plurality of links supporting the weight, one of which links has its mean movement parallel to the axis of the element.

9. A governor, including a fly weight, and a bell crank having the mean movement of its weight-carrying arm normal to the radius of revolution of the weight.

10. A governor, including a rotary element, a fly weight driven by the element, and a bell crank having the mean movement of its weight-carrying arm parallel to the axis of the element, and the other arm of the lever in its lowest position normal to the element.

11. The combination in a governor, of a fly weight, a spring, and a link connected to said spring for supporting said weight.

12. The combination in a governor, of a fly weight, a spring, and a bell-crank lever connected to said spring for supporting said weight, said effective lever length of the spring-connected arm of said bell-crank increasing in proportion to the speed of the governor.

In testimony whereof I affix my signature in presence of two witnesses.

RUDOLPH SIEGMUND.

Witnesses:
 GEO. E. KIRK,
 G. F. DEWEIN.